United States Patent
Yumisashi et al.

(10) Patent No.: US 10,513,968 B2
(45) Date of Patent: Dec. 24, 2019

(54) REFRIGERANT CONTROL VALVE APPARATUS

(71) Applicant: AISIN SEIKI KABUSHIKI KAISHA, Kariya-shi, Aichi (JP)

(72) Inventors: Naoto Yumisashi, Nagoya (JP); Koichi Maruyama, Anjo (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 289 days.

(21) Appl. No.: 15/527,184

(22) PCT Filed: Sep. 25, 2015

(86) PCT No.: PCT/JP2015/077132
§ 371 (c)(1),
(2) Date: May 16, 2017

(87) PCT Pub. No.: WO2016/092935
PCT Pub. Date: Jun. 16, 2016

(65) Prior Publication Data
US 2017/0335750 A1 Nov. 23, 2017

(30) Foreign Application Priority Data
Dec. 12, 2014 (JP) .................................. 2014-251990

(51) Int. Cl.
*F01P 7/16* (2006.01)
*F16K 11/087* (2006.01)
(Continued)

(52) U.S. Cl.
CPC ........ *F01P 7/16* (2013.01); *F16K 5/06* (2013.01); *F16K 5/205* (2013.01); *F16K 11/06* (2013.01);
(Continued)

(58) Field of Classification Search
CPC ........ F16K 5/06; F16K 5/0673; F16K 5/0678; F16K 5/201; F16K 5/205; F16K 7/16;
(Continued)

(56) References Cited

U.S. PATENT DOCUMENTS 2,503,639 A * 4/1950 Snyder ............... F16K 5/0464
137/625.47
2,839,074 A * 6/1958 Kaiser ............... F16K 5/0636
137/315.18

(Continued)

FOREIGN PATENT DOCUMENTS

EP 3168511 A1 5/2017
JP 2008232260 A * 10/2008 .............. F01P 7/16

(Continued)

OTHER PUBLICATIONS

Extended European Search Report dated Oct. 25, 2017, issued by the European Patent Office in corresponding European Application No. 15868318.5 (8 pages).

*Primary Examiner* — John M Zaleskas
(74) *Attorney, Agent, or Firm* — Buchanan Ingersoll & Rooney PC

(57) ABSTRACT

A refrigerant control valve apparatus includes a valve body accommodated inside a valve housing, the valve housing being formed with an inlet port and a discharge port. A seal mechanism includes a seal body and a biasing mechanism. The seal mechanism is provided with a first pressure receiving surface receiving pressure of the refrigerant, which acts in a direction same as a biasing direction of the biasing mechanism, and a second pressure receiving surface receiving pressure of the refrigerant, which acts in a direction opposite to the biasing direction of the biasing mechanism. The first pressure receiving surface and the second first pressure receiving surface are formed to include an equal area to each other, and the seal mechanism is accommodated (Continued)

within a seal accommodation space such that pressure of the refrigerant from the inlet port acts on the first pressure receiving surface and the second pressure receiving surface.

4 Claims, 8 Drawing Sheets

(51) Int. Cl.
  *F16K 31/04*  (2006.01)
  *F16K 5/06*   (2006.01)
  *F16K 11/06*  (2006.01)
  *F16K 5/20*   (2006.01)
  *F16K 11/08*  (2006.01)
  *F01P 7/14*   (2006.01)

(52) U.S. Cl.
  CPC ............ *F16K 11/08* (2013.01); *F16K 11/087* (2013.01); *F16K 31/04* (2013.01); *F01P 2007/146* (2013.01)

(58) Field of Classification Search
  CPC ........ F16K 11/06; F16K 11/08; F16K 11/087; F16K 31/04; F01P 2007/146
  USPC ...... 137/625.47; 251/170, 171, 174, 315.01; 123/41.08
  See application file for complete search history.

(56) References Cited

U.S. PATENT DOCUMENTS

| | | | | | |
|---|---|---|---|---|---|
| 2,929,606 | A * | 3/1960 | Kaiser | .................... | F16K 5/0694 251/174 |
| 3,266,769 | A * | 8/1966 | Shand | .................... | F16K 5/0673 251/172 |
| 3,421,733 | A * | 1/1969 | Stewart, Jr. | ............ | F16K 5/0673 251/172 |
| 3,667,727 | A * | 6/1972 | Bowden | ................ | F16K 3/0227 251/172 |
| 3,794,291 | A * | 2/1974 | Suyama | ................ | F16K 5/0673 251/171 |
| 3,960,363 | A * | 6/1976 | Domyan | ............... | F16K 5/0642 251/174 |
| 3,990,465 | A * | 11/1976 | Allen | ...................... | F16K 5/227 137/72 |
| 4,108,196 | A * | 8/1978 | Calvert | ................. | F16K 5/0673 137/72 |
| 4,318,420 | A * | 3/1982 | Calvert | ................. | F16K 5/0673 137/74 |
| 4,477,055 | A * | 10/1984 | Partridge | ............. | F16K 5/0673 137/328 |
| 4,557,286 | A * | 12/1985 | Nagano | ................ | F16K 5/0673 137/72 |
| 4,911,408 | A * | 3/1990 | Kemp | .................... | F16K 5/0673 251/174 |
| 6,039,304 | A * | 3/2000 | Carlson | ..................... | F16K 5/12 251/118 |
| 6,073,648 | A * | 6/2000 | Watson | ................. | F16K 5/0657 106/14.33 |
| 2004/0173167 | A1 * | 9/2004 | Chanfreau | ......... | B60H 1/00485 123/41.1 |
| 2007/0137592 | A1 * | 6/2007 | Hanai | ...................... | F01P 11/20 123/41.14 |
| 2008/0230731 | A1 * | 9/2008 | Dalmasso | ............. | F16K 5/0631 251/170 |
| 2010/0090146 | A1 * | 4/2010 | Keeper | ................... | F16K 5/188 251/172 |
| 2010/0243938 | A1 * | 9/2010 | Sumiya | ................. | F16K 5/0689 251/315.1 |
| 2011/0062366 | A1 * | 3/2011 | Thomas | ................ | F16K 5/0642 251/315.01 |
| 2011/0266481 | A1 * | 11/2011 | Collison | ............... | F16K 5/0636 251/315.01 |
| 2012/0055652 | A1 | 3/2012 | Triebe et al. | | |
| 2013/0026406 | A1 * | 1/2013 | Kawauchi | ............... | F16K 5/205 251/313 |
| 2013/0221116 | A1 * | 8/2013 | Tsuchiya | ................... | F01P 7/14 236/34.5 |
| 2013/0240772 | A1 * | 9/2013 | Lomax | ................. | F16K 5/0631 251/315.01 |
| 2014/0190427 | A1 * | 7/2014 | Nagahama | ............... | F01P 7/16 123/41.1 |
| 2014/0291566 | A1 * | 10/2014 | Yokoyama | ............ | F16K 5/0689 251/315.01 |
| 2014/0305154 | A1 * | 10/2014 | Yoshioka | ................ | F25B 41/04 62/324.6 |
| 2014/0374495 | A1 * | 12/2014 | Malone | ..................... | F01P 7/14 236/34.5 |
| 2015/0027572 | A1 * | 1/2015 | Morein | ............... | F16K 11/0876 137/625.19 |
| 2015/0027575 | A1 * | 1/2015 | Morein | ................. | F16K 11/165 137/865 |
| 2015/0075452 | A1 * | 3/2015 | Oikawa | ..................... | F01P 7/14 123/41.1 |
| 2015/0075453 | A1 * | 3/2015 | Oikawa | ..................... | F01P 7/14 123/41.1 |
| 2015/0075658 | A1 * | 3/2015 | Tsuchiya | ................... | F16K 5/04 137/625.47 |
| 2015/0083057 | A1 * | 3/2015 | Tsuchiya | ................... | F01P 7/14 123/41.08 |
| 2015/0122359 | A1 * | 5/2015 | Tsuchiya | ................... | F01P 7/16 137/625.47 |
| 2015/0377365 | A1 * | 12/2015 | Fan | ....................... | F16K 5/0689 251/315.1 |
| 2016/0003126 | A1 * | 1/2016 | Carns | ......................... | F01P 7/14 123/41.44 |
| 2016/0010536 | A1 * | 1/2016 | Murakami | ............ | F16K 11/085 137/625.44 |
| 2016/0109031 | A1 * | 4/2016 | Greene | ................... | F16K 5/201 251/314 |
| 2016/0123218 | A1 * | 5/2016 | Lee | ......................... | F01P 7/165 123/41.08 |
| 2016/0160737 | A1 * | 6/2016 | Lee | .......................... | F01P 7/14 123/41.08 |
| 2016/0281585 | A1 * | 9/2016 | Muizelaar | .................. | F01P 7/14 |
| 2017/0009894 | A1 | 1/2017 | Seko et al. | | |
| 2017/0335749 | A1 * | 11/2017 | Maruyama | ................ | F01P 7/16 |

FOREIGN PATENT DOCUMENTS

| | | | |
|---|---|---|---|
| JP | 2008232260 A | 10/2008 | |
| JP | 2013-29127 A | 2/2013 | |
| JP | 2013238155 A * | 11/2013 | ............... F01P 7/16 |
| JP | 2016-053415 A | 4/2016 | |

* cited by examiner

REFRIGERANT CONTROL VALVE APPARATUS

TECHNICAL FIELD

The present invention relates to a technique, at a refrigerant control valve apparatus, to enhance a sealing performance of a seal body arranged between a valve body rotatably accommodated in a valve housing and a discharge port.

BACKGROUND ART

Although a technique indicated in Patent document 1 is not intended for a refrigerant, the technique includes a valve body rotatably accommodated inside a valve housing, a seal body (a seat member in the document) formed in a ring shape and fitted to an exterior of a cylindrical portion of a guide member forming a fluid flow path, and a spring member biasing the seal body in a direction in which being in contact with an outer surface of the valve body.

In Patent document 1, the valve body includes an outer surface formed in a spherical shape and the seal body is formed in the ring shape so as to be in contact with the outer surface. In addition, in Patent document 1, a connection portion is formed at an outer circumferential surface of the seal body such that pressure of fluid acts on a pressure receiving surface of the seal body, the pressure receiving surface which faces the valve body, and on another pressure receiving surface of the seal body, the pressure receiving surface which is at a side opposite thereto.

In addition, in Patent document 1, areas of the respective pressure receiving portions are equal to each other. By forming the above-described connection portion, pressure working on the pressure receiving surface from the fluid in a direction which is against a biasing force of the spring member and pressure working on the pressure receiving surface from the fluid in a direction along the biasing force of the spring member cancel out each other or are balanced out with each other, thereby inhibiting an inconvenience in which an excessive pressure acts relative to the seal body.

DOCUMENT OF PRIOR ART

Patent Document

Patent document 1: JP2013-29127A

OVERVIEW OF INVENTION

Problem to be Solved by Invention

According to the configuration of Patent document 1, a constant pressure works from the fluid relative to the pair of pressure receiving surfaces in a case where the valve body is in an open posture, however, the fluid is not supplied to a space portion in which the valve body is accommodated in a case where the valve body is in a closed posture. Thus, it is considered that the pressures working from the fluid onto the pair of pressure receiving surfaces are temporarily imbalanced at the operation of the valve body.

In a case where the pressures acting on the pair of pressure receiving surfaces of the seal mechanism are in the imbalanced state as described above, pressure at which the seal body is in contact with the valve body also fluctuates. Accordingly, a phenomenon may occur in which a contact surface of the seal body is subject to abrasion and/or operation resistance of the valve body increases, and thus there is room for improvement.

Consequently, it is desired that a refrigerant control valve apparatus is configured, at which a seal body is stably in contact with a valve body without fluctuations of a contact pressure of the seal body, regardless of operation of the valve body.

Means for Solving Problem

A characteristic of the present invention is that a refrigerant control valve apparatus includes a valve housing provided with an inlet port to which refrigerant from an internal combustion engine is supplied and a discharge port from which the refrigerant is sent out, a valve body provided at an inside of the valve housing to be rotatable about a rotational axis, the valve body including an internal space portion to which the refrigerant is supplied from the inlet port and a valve surface corresponding to an outer surface including a spherical shape, the valve body being provided with a hole portion which is formed at the valve surface and allows the internal space portion to be in communication with the discharge port by rotation about the rotational axis, the valve body corresponding to a rotary-type, and a seal mechanism supported by a member of the valve housing, the member which forms the discharge port, the seal mechanism being in contact with the valve surface of the valve body, wherein the seal mechanism includes a seal body formed in a ring shape when viewed in a direction in which the refrigerant is discharged at the discharge port, the seal body is contactable with the valve surface of the valve body, the seal mechanism includes a biasing mechanism applying a biasing force to the seal body in a pressing direction towards a spherical center of the valve surface, and the seal mechanism includes a first pressure receiving surface and a second pressure receiving surface, the first pressure receiving surface receives pressure acting, in a direction which is same as a biasing direction of the biasing mechanism, from the refrigerant relative to the seal body or to a mobile body including the seal body and moving integrally with the seal body, the second pressure receiving surface receives pressure acting, in a direction which is opposite to the biasing direction, from the refrigerant relative to the seal body or to the mobile body, the first pressure receiving surface and the second pressure receiving surface are formed to include areas which are equal to each other, the seal mechanism is accommodated in a seal accommodation space which is in communication with the inlet port such that pressure of the refrigerant from the inlet port acts relative to the first pressure receiving surface and to the second pressure receiving surface.

According to this configuration, since the seal mechanism is accommodated in the seal accommodation space, the pressure of the refrigerant supplied from the inlet port is made to act relative to the first pressure receiving surface and to the second pressure receiving surface, and thus the pressure acting relative to the seal body in the direction same as the biasing direction of the biasing mechanism and the pressure acting in the direction opposite to the biasing direction can be cancelled out with each other. In addition, the pressure of the refrigerant from the inlet port can be applied to the first pressure receiving surface and to the second pressure receiving surface regardless of an operation state of the valve body, and thus the pressure acting on the seal body does not fluctuate or vary every time the valve body is operated, and in consequence, the valve body can be stabilized. Consequently, the refrigerant control valve apparatus is configured, which allows the seal body to be stably in contact with the valve body without the fluctuations of a contact pressure of the seal body regardless of the operation of the valve body.

As another characteristic, an internal sleeve including a cylindrical shape may be formed coaxially with a sleeve axis which is orthogonal to the rotational axis and passes through the spherical center of the valve surface, the internal sleeve protrudes from the discharge port to the inside the valve housing, an outer circumferential surface of the internal sleeve may include a cylindrical outer surface shape of which a center is the sleeve axis, the biasing mechanism and the seal body are arranged at positions surrounding an outer circumference of the internal sleeve to be movable along the sleeve axis, a packing body may be provided to be in contact with the outer circumference of the internal sleeve to separate the seal accommodation space and a space portion of an inner circumferential position of the seal body from each other, and a contact position at which a virtual cylindrical surface obtained by extending the outer circumferential surface of the internal sleeve in a direction along the sleeve axis and the valve surface intersect each other may be set at a circumferentially outermost position in a contact region in which the seal body is in contact with the valve surface.

According to this, the packing body inhibits a phenomenon in which the refrigerant moves and flows between the seal accommodation space and a space portion at an inner circumference of the internal sleeve. Since the first pressure receiving surface and the second pressure receiving surface are formed at an outer side relative to the contact position at which the virtual cylindrical surface and the valve surface intersect each other, the first pressure receiving surface and the second pressure receiving surface are formed to include the same area as each other. Accordingly, the internal sleeve supports the seal mechanism stably. Moreover, the refrigerant pressures acting on the respective first pressure receiving surface and second pressure receiving surface can be well-balanced each other without releasing the pressure of the refrigerant, which acts on the first pressure receiving surface and the second pressure receiving surface that are formed at the outer side relative to the outer circumferential surface of the internal sleeve, to the space portion at the inner circumference of the internal sleeve.

As another characteristic, the inlet port may supply the refrigerant in a direction along the rotational axis in the valve housing, and the valve body may send the refrigerant from the inlet port in the direction along the rotational axis in the internal space portion.

According to this, the refrigerant supplied from the inlet port is sent in the direction along the rotational axis in the internal space portion. Accordingly, for example, by forming the valve body in a shape extending in the direction along the rotational axis and by forming an opening in the extended region, the refrigerant can be supplied to and discharged from a port other than the discharge port. Consequently, in addition to the discharge port, the supply and discharge of the refrigerant also relative to, for example, a heater and/or various devices, can be achieved with the valve apparatus.

Another characteristic is that a refrigerant control valve apparatus includes a valve housing provided with an inlet port to which refrigerant from an internal combustion engine is supplied and a discharge port from which the refrigerant is sent out, a valve body provided at an inside the valve housing to be rotatable about a rotational axis, the valve body including an internal space portion which is in communication with the discharge port and a valve surface corresponding to an outer surface including a spherical shape, the valve body being provided with a hole portion which is formed at the valve surface and allows the internal space portion to be in communication with the inlet port by rotation about the rotational axis, the valve body corresponding to a rotary-type, and a seal mechanism supported by a member of the valve housing, the member which forms the inlet port, the seal mechanism being in contact with the valve surface of the valve body, wherein the seal mechanism includes a seal body formed in a ring shape when viewed in a direction in which the refrigerant is supplied at the inlet port, the seal body is contactable with the valve surface of the valve body, the seal mechanism includes a biasing mechanism applying a biasing force to the seal body in a pressing direction towards a spherical center of the valve surface, and the seal mechanism includes a first pressure receiving surface and a second pressure receiving surface, the first pressure receiving surface receives pressure acting, in a direction which is same as a biasing direction of the biasing mechanism, from the refrigerant relative to the seal body or to a mobile body including the seal body and moving integrally with the seal body, the second pressure receiving surface receives pressure acting, in a direction which is opposite to the biasing direction, from the refrigerant relative to the seal body or to the mobile body, the first pressure receiving surface and the second pressure receiving surface are formed to include areas which are equal to each other, the seal mechanism is accommodated in a seal accommodation space which is in communication with the inlet port such that pressure of the refrigerant from the inlet port acts relative to the first pressure receiving surface and to the second pressure receiving surface.

According to this configuration, since the seal mechanism is accommodated in the seal accommodation space, the pressure of the refrigerant supplied from the inlet port is made to act relative to the first pressure receiving surface and to the second pressure receiving surface, and thus the pressure acting relative to the seal body in the direction same as the biasing direction of the biasing mechanism and the pressure acting in the direction opposite to the biasing direction can be cancelled out with each other. In addition, the pressure of the refrigerant from the inlet port can be applied to the first pressure receiving surface and to the second pressure receiving surface regardless of an operation state of the valve body, and thus the pressure acting to the seal body does not fluctuate or vary every time the valve body is operated, and in consequence, the valve body can be stabilized. Consequently, the refrigerant control valve apparatus is configured, which allows the seal body to be stably in contact with the valve body without the fluctuations of a contact pressure of the seal body regardless of the operation of the valve body.

As another characteristic, an internal sleeve including a cylindrical shape may be formed coaxially with a sleeve axis which is orthogonal to the rotational axis and passes through the spherical center of the valve surface, the internal sleeve may protrude from the inlet port to the inside the valve housing, an inner circumferential surface of the internal sleeve may include a cylindrical inner surface shape of which a center is the sleeve axis, the biasing mechanism and the seal body may be arranged at an inner circumference of the internal sleeve to be movable along the sleeve axis, a packing body may be provided to be in contact with the inner circumference of the internal sleeve to separate the seal accommodation space and an outer space portion of the internal sleeve from each other, and a contact position at which a virtual cylindrical surface obtained by extending the inner circumferential surface of the internal sleeve in a direction along the sleeve axis and the valve surface intersect each other may be set at a circumferentially innermost position in a contact region in which the seal body is in contact with the valve surface.

According to this, the packing body inhibits a phenomenon in which the refrigerant moves and flows between the seal accommodation space in which the refrigerant from the inlet port flows and the outer space portion of the internal sleeve. Since the first pressure receiving surface and the second pressure receiving surface are formed at an inner side relative to the contact position at which the virtual cylindrical surface and the valve surface intersect each other, the first pressure receiving surface and the second pressure receiving surface are formed to include the same area as each other. Accordingly, the refrigerant pressures acting on the respective first pressure receiving surface and second pressure receiving surface can be well-balanced each other without releasing the pressure of the refrigerant, which acts on the first pressure receiving surface and the second pressure receiving surface that are formed at the outer side relative to the outer circumferential surface of the internal sleeve, to the outer space portion the inner circumference of the internal sleeve.

As another characteristic, an electric actuator rotating the valve body about the rotational axis may be provided.

According to this, the valve body is rotated about the rotational axis by a drive force of the electric actuator, thereby achieving switching between a state in which the refrigerant from the inlet port being discharged to the discharge port and a state in which being blocked, by an electric control.

MODE FOR CARRYING OUT THE INVENTION

An embodiment of the present invention will be described hereunder on the basis of the drawings.

Figure 1:
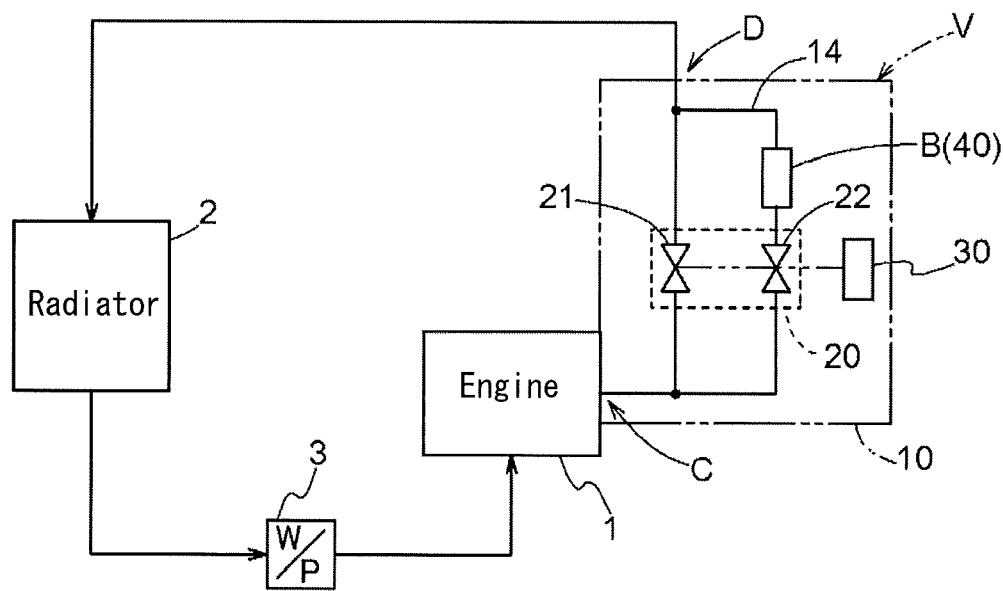
FIG. 1 is a diagram illustrating a configuration of a refrigeration system.
Figure 2:
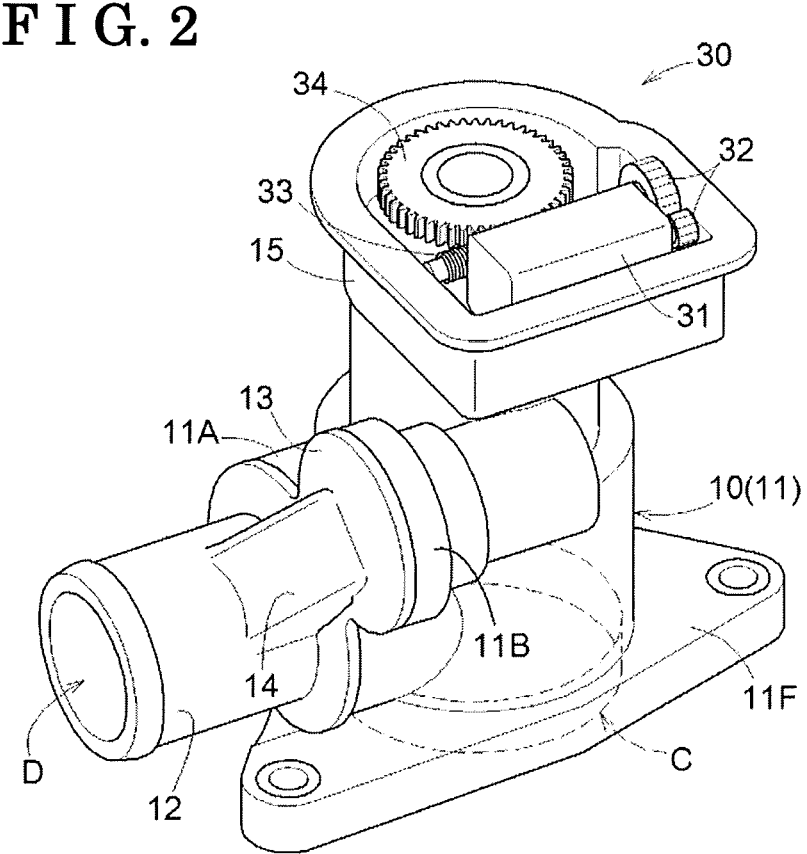
FIG. 2 is a perspective view illustrating an overall configuration of a valve apparatus.

[Basic configuration] As illustrated in FIG. 1, a refrigeration system for an engine is configured to include a valve apparatus V (an example of a refrigerant control valve apparatus) which supplies coolant water (an example of a refrigerant) of an engine 1 serving as an internal combustion engine to a radiator 2, and a water pump 3 (which is abbreviated as W/P in the drawing) which returns the coolant water from the radiator 2 back to the engine 1.

The refrigeration system controls the valve apparatus V on the basis of a measurement result of a water temperature sensor which measures temperature (water temperature) of the coolant water inside the engine 1 and, in accordance with the control, the refrigeration system functions to set a water amount of the coolant water circulating between the engine 1 and the radiator 2. That is, the control is performed such that the supply of the coolant water from the engine 1 to the radiator 2 is stopped in a case where a warming-up is needed, for example, immediately after the engine 1 is started, and such that a flow amount of the coolant water (the refrigerant) is set so as to maintain temperature of the engine 1 appropriately after the warming-up.

[Valve apparatus] As illustrated in FIGS. 2 to 4 and FIG. 8, the valve apparatus V includes a valve housing 10 made of resin, a valve body 20 made of resin which is a rotary type valve body, a posture setting unit 30 which sets a rotation posture of the valve body 20 and a fail-safe mechanism 40 which is open in a case where the temperature of the coolant water exceeds a set value. The valve apparatus V further includes a seal mechanism 50 provided between the valve body 20 and an inner end of a discharge cylinder 12 serving as a discharge port D.

The valve housing 10 includes a housing main body 11 provided with a flange portion 11F, the discharge cylinder 12, a temperature sensing chamber cover 13 closing a temperature sensing chamber B (refer to FIG. 4), a bypass flow path 14 sending the coolant water in the temperature sensing chamber B to the discharge cylinder 12, and a unit accommodation portion 15 accommodating the posture setting unit 30. A cover body of the unit accommodation portion 15 is omitted in the drawings, however, the unit accommodation portion 15 includes a sealing structure when being covered with the cover body.

At the valve apparatus V, a valve chamber A accommodating the valve body 20 is formed inside the housing main body 11 and the temperature sensing chamber B accommodating the fail-safe mechanism 40 is formed at a position that is in communication with the valve chamber A. An inlet port C is formed at a flange surface of the flange portion 11F. With the above-described configuration, by fixedly connecting the flange portion 11F to an outer wall of the engine 1, the coolant water at a water jacket can be supplied directly to the inlet port C. The discharge cylinder 12 functions as the discharge port D, and a radiator hose through which the coolant water is sent to the radiator 2 is connected to the discharge cylinder 12.

The housing main body 11 includes a main cylindrical portion 11A being in communication with the discharge port D and a sub cylindrical portion 11B forming the temperature sensing chamber B, which are made of resin material to be integral with the housing main body 11. The discharge cylinder 12, the temperature sensing chamber cover 13 and the bypass flow path 14 are configured as an integral object. An internal sleeve 12A is formed at a position which continues to the discharge cylinder 12. A connection portion 12B including a flange shape is formed at a boundary position between the discharge cylinder 12 and the internal sleeve 12A.

With the above-described configuration, the internal sleeve 12A of the discharge cylinder 12 is inserted into an inside of the main cylindrical portion 11A, the connection portion 12B is made to be in contact with an outer end portion of the main cylindrical portion 11A, and the contact portion is welded. The temperature sensing chamber cover 13 is arranged at a position at which the sub cylindrical portion 11B is covered or closed, and then the temperature sensing chamber cover 13 is welded. Thus, the discharge cylinder 12 is formed in a protruding manner, and the temperature sensing chamber B and the discharge cylinder 12 are in communication with each other via the bypass flow path 14.

The valve body 20 is formed, as a whole, in a cylindrical shape of which a center is a rotational axis X. A main control valve 21 is formed at the valve body 20 at one side in a direction along the rotational axis X and a temperature sensing control valve 22 is formed at another side. The main control valve 21 includes a spherical surface 21A formed at an outer circumference and serving as a valve surface. The main control valve 21 includes a main hole portion 21B which allows the spherical surface 21A (an example of the valve surface) and an internal space portion 21S of the valve body to be in communication with each other. An outer circumference of the temperature sensing control valve 22 is formed as a cylindrical surface 22A. A temperature sensing hole portion 22B allowing the cylindrical surface 22A and the internal space portion 21S of the valve body 20 to be in communication with each other is formed at the temperature sensing control valve 22.

That is, the internal space portion 21S of the valve body 20 is in a state of being in communication with the valve chamber A, and is in a state in which the coolant water from the inlet port C can flow into the internal space portion 21S. The main control valve 21 controls supply and discharge of the coolant water relative to the discharge port D. The temperature sensing control valve 22 functions to control supply and discharge of the coolant water relative to the temperature sensing chamber B. The main control valve 21 and the temperature sensing control valve 22 rotate integrally with the valve body 20.

A support portion 23 is integrally formed at an inside of the valve body 20. The support portion 23 includes an opening which enables the coolant water to flow and a connection portion provided at a central position. An intermediate portion of a rotational shaft 24 is connected to the support portion 23. Thus, the rotational shaft 24 is arranged coaxially with the rotational axis X.

A shaft bearing body 25 is provided in a manner that the shaft bearing body 25 is fitted in the inlet port C of the housing main body 11. The shaft bearing body 25 includes an opening which enables the coolant water to flow in and a bearing portion formed at a central position. One end of the rotational shaft 24 is rotatably supported at the bearing portion. A shaft bearing portion 26 is provided at the housing main body 11, at a side opposite to the inlet port C, and the other end of the rotational shaft is rotatably supported at the shaft bearing portion 26.

The posture setting unit 30 is accommodated in the unit accommodation portion 15 which is a sealed space portion. The posture setting unit 30 includes a wheel gear 34, and a drive force of an electric motor 31 serving as an electric actuator is reduced at a reduction gear 32 and then is transmitted to the a worm gear 33, and the wheel gear 34 is driven by the worm gear 33. The wheel gear 34 is connected to an end portion of the rotational shaft 24.

The posture setting unit 30 includes a rotational angle sensor 35 which detects a posture of the valve body 20 from a rotation posture of the wheel gear 34. The rotational angle sensor 35 is a non-contact type sensor which detects a rotation angle from magnetic flux of permanent magnet provided at the wheel gear 34, however, a contact-type including potentiometer may be used, for example.

With the above-described configuration, the electric motor 31 (the electric actuator) is operated by a drive signal from an outside, and rotates the rotational shaft 24 by feeding back a signal of the rotational angle sensor 35. Thus, an opening degree of the main control valve 21 can be set at a target value.

Figure 4:
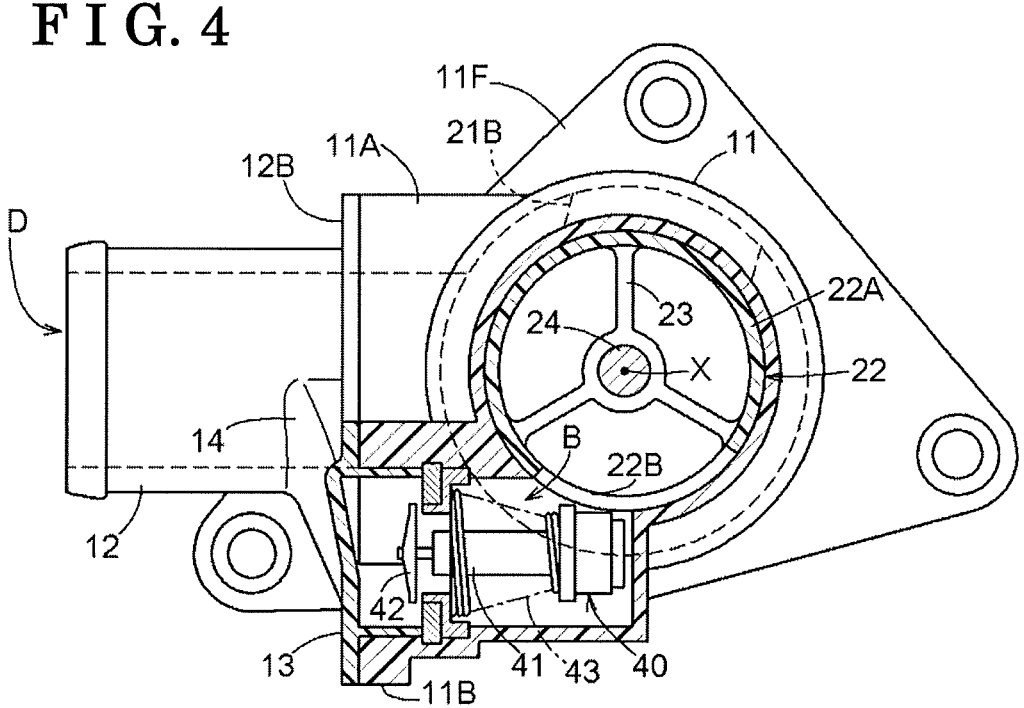
FIG. 4 is a transverse cross-sectional view of the valve apparatus in a state in which the main control valve is in the closed state.
Figure 6:
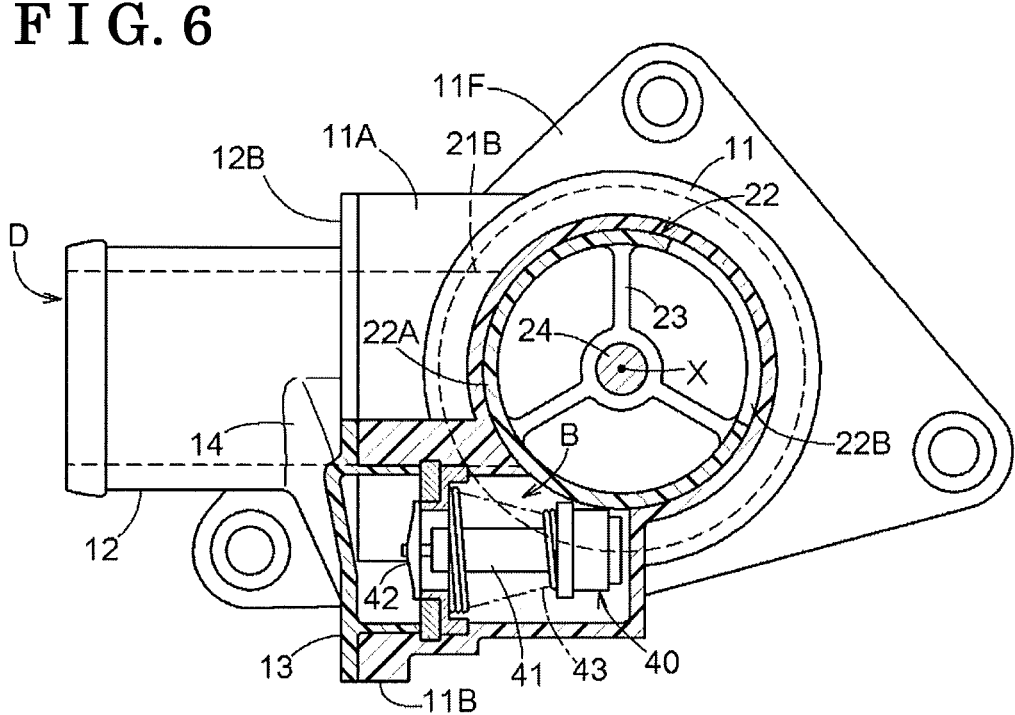
FIG. 6 is a transverse cross-sectional view of the valve apparatus in a state in which the main control valve is in the open state.

[Fail-safe mechanism] As illustrated in FIGS. 4 and 6, the fail-safe mechanism 40 includes a heat sensing member 41, including wax, an on-off valve 42 supported at an end portion of the heat sensing member 41 and a valve spring 43 biasing the on-off valve 42 in a closing direction.

Figure 3:
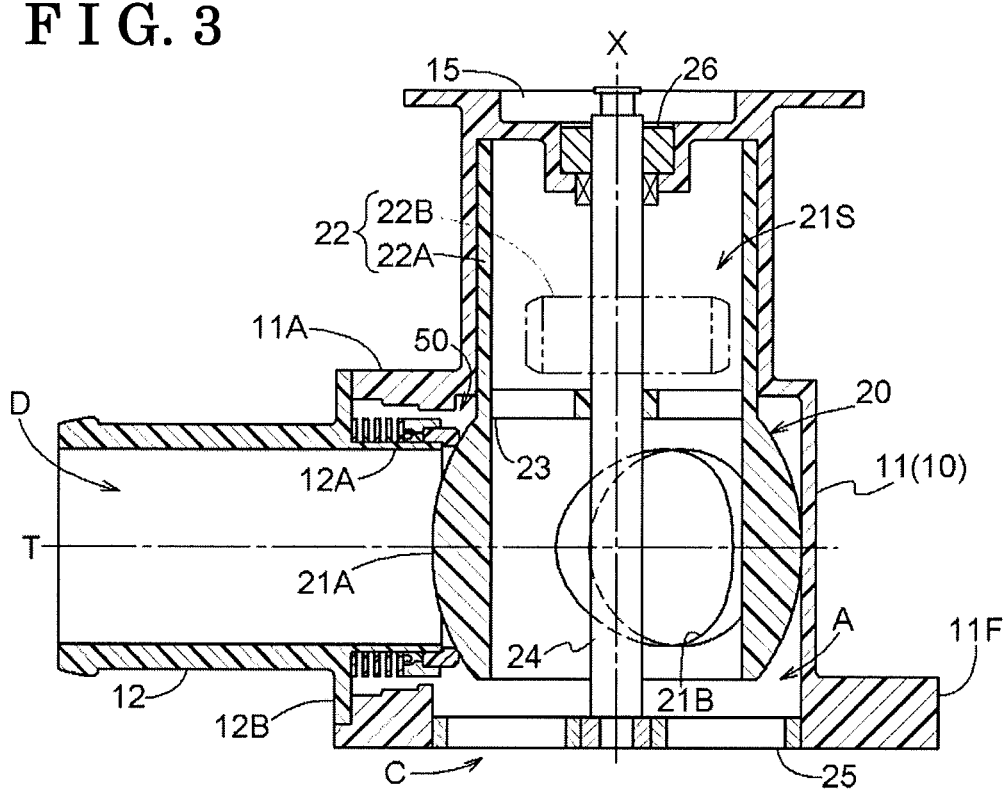
FIG. 3 is a longitudinal cross-sectional view of the valve apparatus in a state in which a main control valve is in a closed state.

According to the valve apparatus V, in a case where the valve body 20 is set in a closed posture illustrated in FIG. 3, the main control valve 21 blocks a flow of the coolant water between the valve chamber A and the discharge cylinder 12 while the temperature sensing control valve 22 allows the valve chamber A and the temperature sensing chamber B to be in communication with each other as illustrated in FIG. 4. Contrary to this, in a case where the valve body 20 is set in an open posture illustrated in FIG. 5, the main control valve 21 allows the valve chamber A and the discharge cylinder 12 to be in communication with each other while the temperature sensing control valve 22 blocks a flow of the coolant water between the valve chamber A and the temperature sensing chamber B as illustrated in FIG. 6.

As described above, the fail-safe mechanism 40 is accommodated in the temperature sensing chamber B. The coolant water is supplied from the valve chamber A to the fail-safe mechanism 40 via the temperature sensing hole portion 22B of the temperature sensing control valve 22 only in a case where the main control valve 21 is in the closed posture. That is, the temperature sensing chamber B is arranged at a position such that the temperature sensing hole portion 22B of the temperature sensing control valve 22 and the temperature sensing chamber B face each other so that the temperature sensing hole portion 22B and the temperature sensing chamber B are in a linearly-connected-positional relationship with each other, in a state where the temperature sensing control valve 22 opens.

As the temperature of the coolant water exceeds the set value, the heat sensing member 41 expands as illustrated in FIG. 4, and thus the on-off valve 42 opens against the biasing force of the valve spring 43. Accordingly, the coolant water from the inlet port C can be sent to the bypass flow path 14 via the valve chamber A and the temperature sensing chamber B, and then can be discharged from the discharge port D. A mode of operation of the fail-safe mechanism 40 will be described later.

Figure 7:
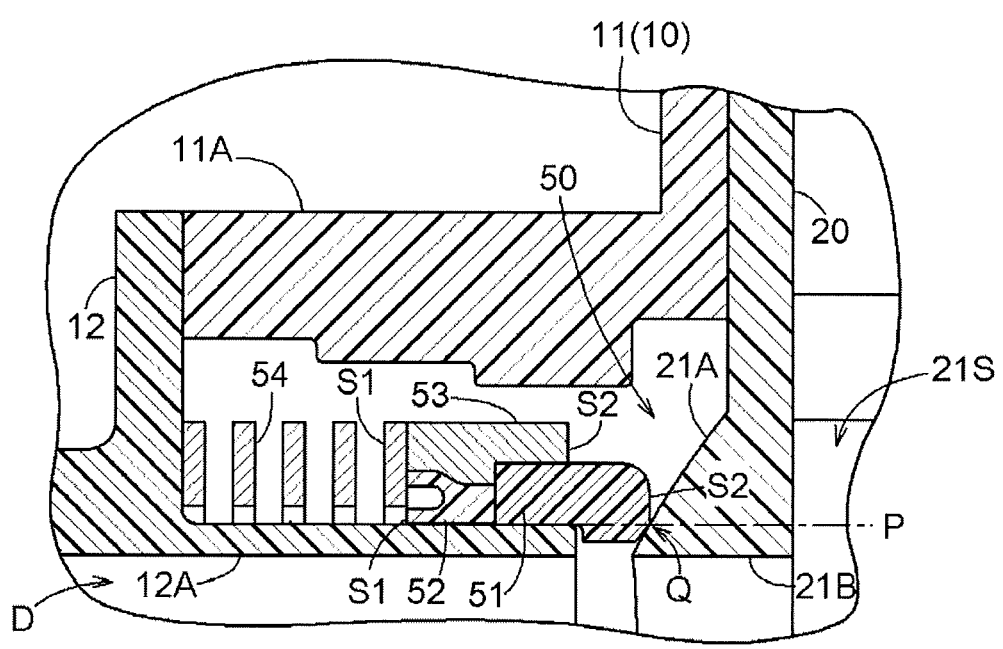
FIG. 7 is a cross-sectional view of a seal mechanism.
Figure 8:
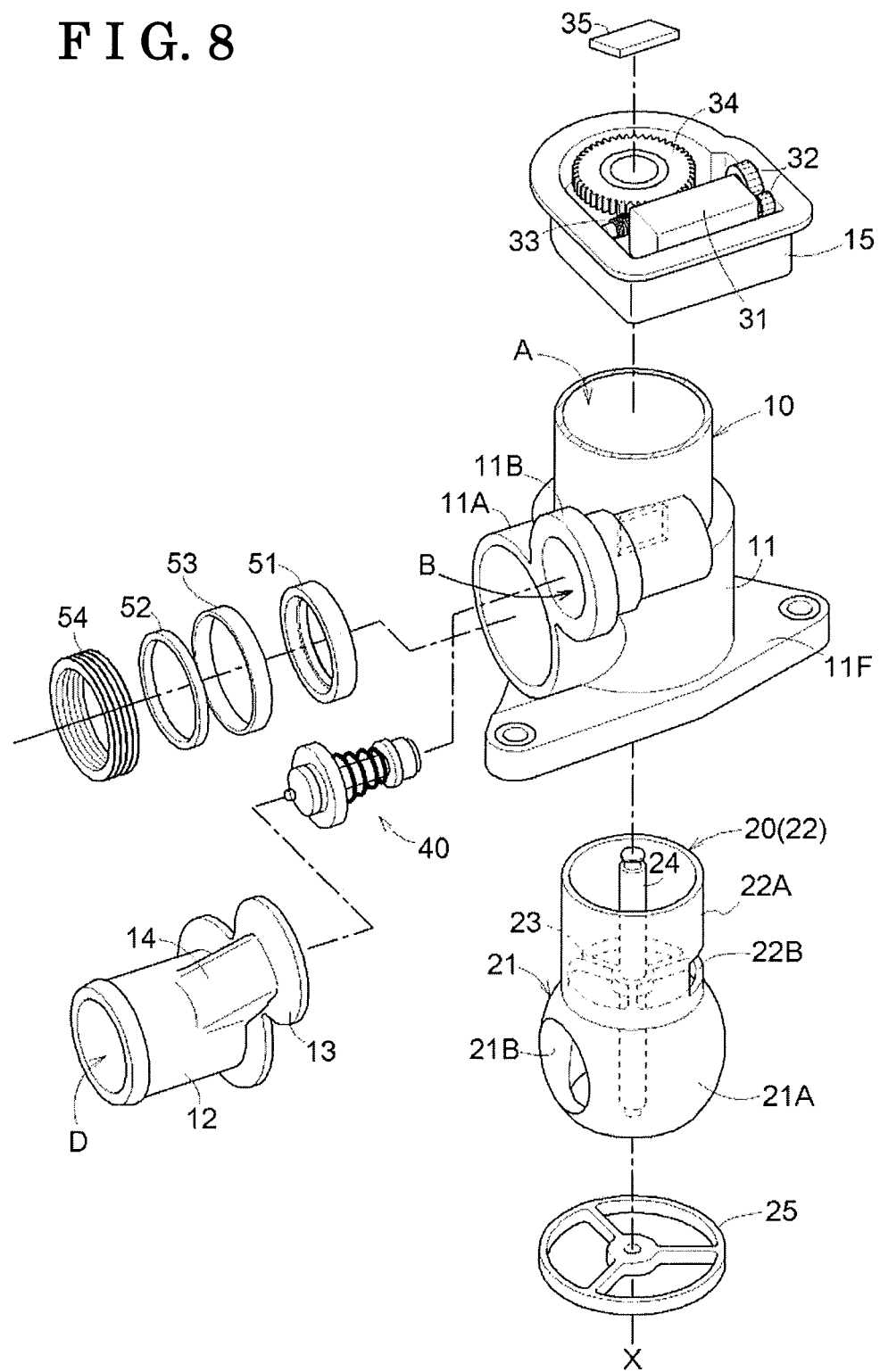
FIG. 8 is an exploded perspective view of the valve apparatus.

[Seal mechanism] As illustrated in FIG. 7, the seal mechanism 50 is formed by a seal ring 51 serving as a seal body, a packing body 52, a support ring 53 and a spring 54 serving as a biasing mechanism, and they are arranged at an outer circumference of the internal sleeve 12A of the discharge cylinder 12, the internal sleeve 12A which is arranged inside the main cylindrical portion 11A.

The internal sleeve 12A is formed to be coaxial with a sleeve axis T which is orthogonal to the rotational axis X and passes through a center of a sphere of the spherical surface 21A serving as the valve surface. An outer circumferential surface of the internal sleeve 12A is formed in a cylindrical outer circumferential surface shape of which a center corresponds to the sleeve axis T.

The seal ring 51 (the seal body) is formed by resin material of which an inner diameter is formed to be slightly larger than a hole diameter of the main hole portion 21B. The seal ring 51 actually provides a sealing performance by being in contact with the spherical surface 21A of the main control valve 21. The packing body 52 is made of resin and formed in a ring shape including a lip portion which is in contact with an outer surface of the internal sleeve 12A. The packing body 52 maintains water-tightness relative to the outer circumference of the internal sleeve 12A, and secludes an accommodation space accommodating therein the seal mechanism 50 and an internal space portion of the internal sleeve 12A from each other. The support ring 53 is formed by metal material including, for example, stainless which makes the biasing force of the spring 54 (the biasing mechanism) to act on the seal ring 51. The spring 54 provides the biasing force to the seal ring 51 via the support ring 53.

At the valve apparatus V, because a gap is provided between an inner wall surface of the housing main body 11 and an outer circumference of the spherical surface 21A of the main control valve 21, the coolant water from the inlet port C flows to the outer circumference of the internal sleeve 12A via the valve chamber A. A space portion at the outer circumference of the internal sleeve 12A corresponds to a seal accommodation space, and the seal mechanism 50 is accommodated in the seal accommodation space. In the seal accommodation space, pressure which is equal to pressure in the inlet port C works, via the coolant water.

In the seal mechanism 50, a mobile body (the seal ring 51, the packing body 52 and the support ring 53 and part of the spring 54) which moves integrally with one another in a direction in which the biasing force of the spring 54 works is arranged at a position surrounded by the coolant water, and accordingly pressure of the coolant water acts on the mobile body. Where a surface which receives pressure acting from the coolant water on the mobile body in the same direction as the working direction of the biasing force of the spring 54 is a first pressure receiving surface S1 and a surface which receives pressure acting from the coolant water to the mobile body in a direction opposite thereto is a second pressure receiving surface S2, an area of the first pressure receiving surface S1 and an area of the second pressure receiving surface S2 are set to be equal to each other. The area of the first pressure receiving surface S1 and the area of the second pressure receiving surface S2 do not need to strictly agree with each other and some error may be included because a purpose is that the pressures working from the coolant water are cancelled out with each other.

With the above-described configuration, the respective pressures are cancelled out or are balanced out with each other, and thus only the biasing force of the spring 54 acts on the seal ring 51. Accordingly, only the pressure that is required for the sealing works, thereby achieving a satisfactory sealing performance. In addition, according to the above-described configuration, the satisfactory sealing performance is obtained without increasing the biasing force of the spring 54, and thus a resistance during the rotational operation of the valve body 20 is not increased, which can also prevent or reduce wear of the seal ring 51.

Specifically, a virtual cylindrical surface P obtained by extending the outer circumferential surface of the internal sleeve 12A in a direction along the sleeve axis T is assumed, and a contact position Q (which includes an annular shape of which a center is the sleeve axis T) at which the virtual or imaginary cylindrical surface P and the spherical surface 21A intersect each other is set at the circumferentially outermost position in a contact region where the seal ring 51 is in contact with the spherical surface 21A. As described above, in the seal mechanism 50, the first pressure receiving surface S1 is formed by part of the spring 54 and part of the packing body 52 in a region of the mobile body, the region which is at an outer side relative to the virtual cylindrical surface P. Similarly, the second pressure receiving surface S2 is formed by part of the seal ring 51 and part of the support ring 53 in a region of the mobile body, the region which is at the outer side relative to the virtual cylindrical surface P. In a case where the first pressure receiving surface S1 and the second pressure receiving surface S2 are projected onto a virtual projection plane which is oriented to be orthogonal to the sleeve axis T, the first pressure receiving surface S1 and the second pressure receiving surface S2 include areas which are equal to each other and each of which includes a ring shape.

In the seal mechanism 50 illustrated in FIG. 7, an inner circumferential side of the seal ring 51 relative to the contact position Q is in contact with the spherical surface 21A of the valve body 20, and the second pressure receiving surface S2 is formed at the outer side relative to the virtual cylindrical surface P as described above. Consequently, an area of contact of the seal ring 51 and the spherical surface 21A with each other may be arbitrarily set as long as a region in which the seal ring 51 and the spherical surface 21A are in contact with each other is set in a region close to the sleeve axis T with reference to the contact position Q.

[Control mode of the valve apparatus] At the valve apparatus V, in a case where the valve body 20 is set in the closed posture as illustrated in FIGS. 3 and 4, the main control valve 21 blocks the flow of the coolant water between the valve chamber A and the discharge cylinder 12, and the temperature sensing control valve 22 makes the valve chamber A and the temperature sensing chamber B to be in communication with each other to allow the coolant water to flow therebetween.

At the valve apparatus V including the above-described configuration, the closed posture is established whenever the main hole portion 21B of the main control valve 21 is in any posture that is unable to supply the coolant water to the discharge cylinder 12. According to the valve apparatus V of the present embodiment, however, even in the closed posture in which the coolant water is not supplied to the discharge cylinder 12, the coolant water needs to be supplied to the fail-safe mechanism 40. Thus, at the valve apparatus V of the present embodiment, in a case where the valve body 20 is in the closed posture, such a posture is set that the main control valve 21 is in a closed state and the temperature sensing hole portion 22B of the temperature sensing control valve 22 is fully open as illustrated in FIGS. 3 and 4.

Figure 5:
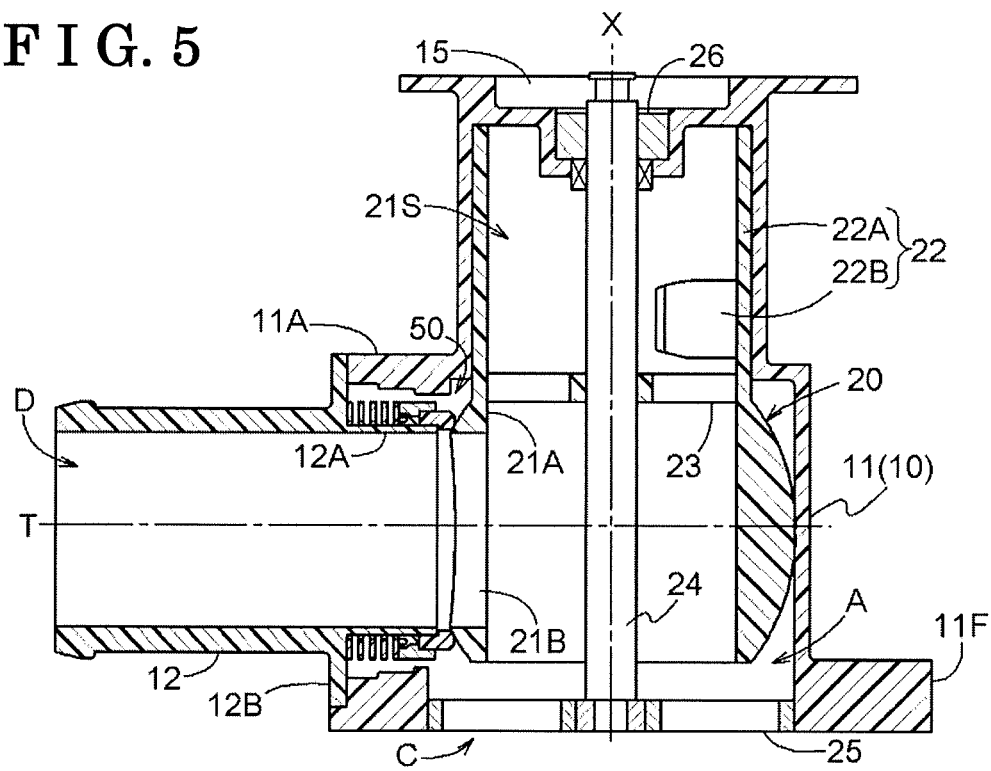
FIG. 5 is a longitudinal cross-sectional view of the valve apparatus in a state in which the main control valve is in an open state.

In a case where the valve body 20 is set to be in the open posture as illustrated in FIGS. 5 and 6, the main control valve 21 makes the valve chamber A and the discharge cylinder 12 to be in communication with each other, and the temperature sensing control valve 22 blocks the flow of the coolant water between the valve chamber A and the temperature sensing chamber B. The open posture is not limited to a fully-open state but includes a posture which allows the coolant water to flow from a part of the main hole portion 21B. As described above, even in a case where the main control valve 21 is in a posture which has not reached the fully-open state, the temperature sensing control valve 22 is maintained in the closed posture.

Consequently, at the warming-up of the engine 1, the posture setting unit 30 sets the valve body 20 at the closed posture. As a result, the coolant water which has flowed from the inlet port C into the valve chamber A is blocked from being supplied to the radiator 2, and the coolant water of the valve chamber A can flow into the temperature sensing chamber B.

In particular, in a case where the temperature of the coolant water exceeds the set value under the circumstances where, for example, the posture setting unit 30 has a failure and thus the main control valve 21 remains fixed in the closed posture, the on-off valve 42 opens due to the expansion of the heat sensing member 41 (refer to FIG. 4). As being opened in the aforementioned way, the coolant water of the engine 1 can be sent from the valve chamber A to the temperature sensing chamber B, and moreover the coolant water from the temperature sensing chamber B can be supplied from the bypass flow path 14 to the discharge cylinder 12, and thereby preventing or reducing overheat of the engine 1.

After the warming-up operation is finished, the posture setting unit 30 rotates the valve body 20 and thereby setting the main control valve 21 in the open posture. Specifically, the opening degree of the main control valve 21 is set low in a case where the temperature of the coolant water is low, and the opening degree is set larger as the temperature increases. Thus, the coolant water that has flowed into the valve chamber A from the inlet port C is supplied to the radiator 2 from the discharge cylinder 12.

In the open posture, the temperature sensing control valve 22 blocks the flow of the coolant water between the valve chamber A and the temperature sensing chamber B, from a state in which the main control valve 21 is slightly open to a state in which the main control valve 21 comes to the fully-opening. Accordingly, even if the temperature of the coolant water increases, a phenomenon in which the fail-safe mechanism 40 is open can be prevented. Further, even in a case where the temperature of the coolant water temporarily increases, and the heat sensing member 41 is expanded by the temperature increment and thus the on-off valve 42 opens, the coolant water does not flow from the valve chamber A to the temperature sending chamber B. Accordingly, a heat management of the engine 1 can be conducted appropriately without increasing an amount of the coolant water supplied to the radiator 2.

In particular, as described above, at the valve apparatus V, the seal mechanism 50 is accommodated in the accommodation space into which the coolant water from the inlet port C flows. For example, in an apparatus at which the pressure in the accommodation space fluctuates or varies in association with the rotational operation of the valve body 20, a flow of the coolant water would be generated in the accommodation space at the rotational operation of the valve body 20, and accordingly a pressure difference may be caused between the first pressure receiving surface S1 and the second pressure receiving surface S2. Contrary to this, the valve apparatus V of the present embodiment is configured such that the pressure of the coolant water supplied from the inlet port C always acts relative to the accommodation space, and consequently the pressure which is equal to the pressure acting on the inlet port C always acts on the first pressure receiving surface S1 and the second pressure receiving surface S2. As a result, a constant pressure acts relative to the seal ring 51 in the accommodation space even when the valve body 20 is rotationally operated, and thus an appropriate sealed state can be maintained.

Other Embodiments

In addition to the aforementioned embodiment, the following configurations may be applicable. As the basic configuration is the same as the aforementioned embodiment, only a different configuration will be explained using the drawings. For facilitating understanding of the drawings, the same names and numerical designations as the aforementioned embodiment are used in the explanation.

Figure 9:
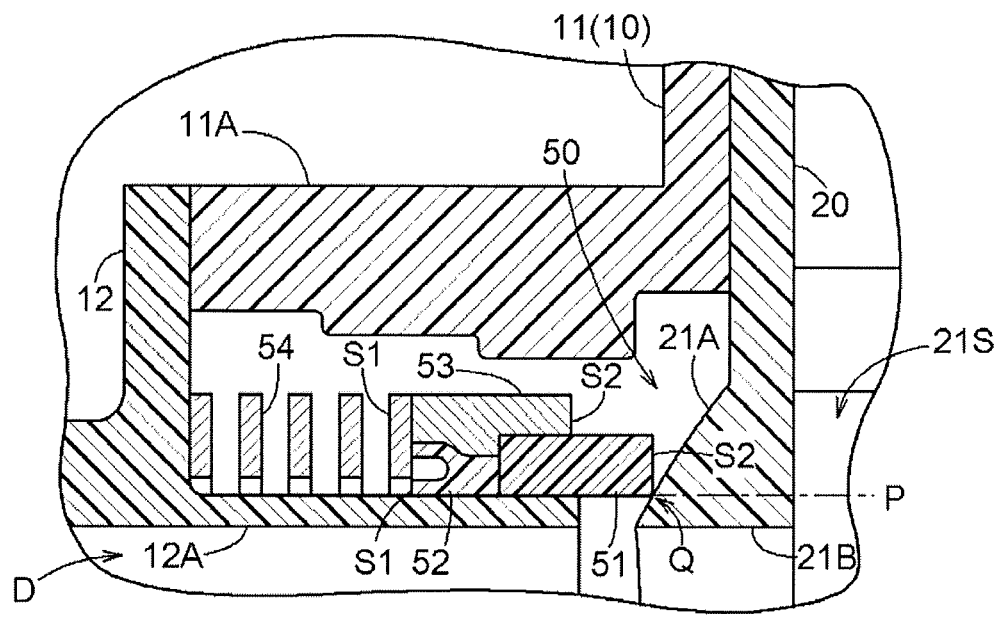
FIG. 9 is a cross-sectional view illustrating a seal ring of another embodiment (a).

(a) As illustrated in FIG. 9, a simple cylindrical material is used as the seal ring 51, and it is configured in a manner that the spherical surface 21A of the valve body 20 is in contact with an inner circumferential edge of the seal ring 51. In this configuration, the cylindrical material including the simple shape can be used as the seal ring, thereby enabling an inexpensive seal ring 51.

Figure 10:
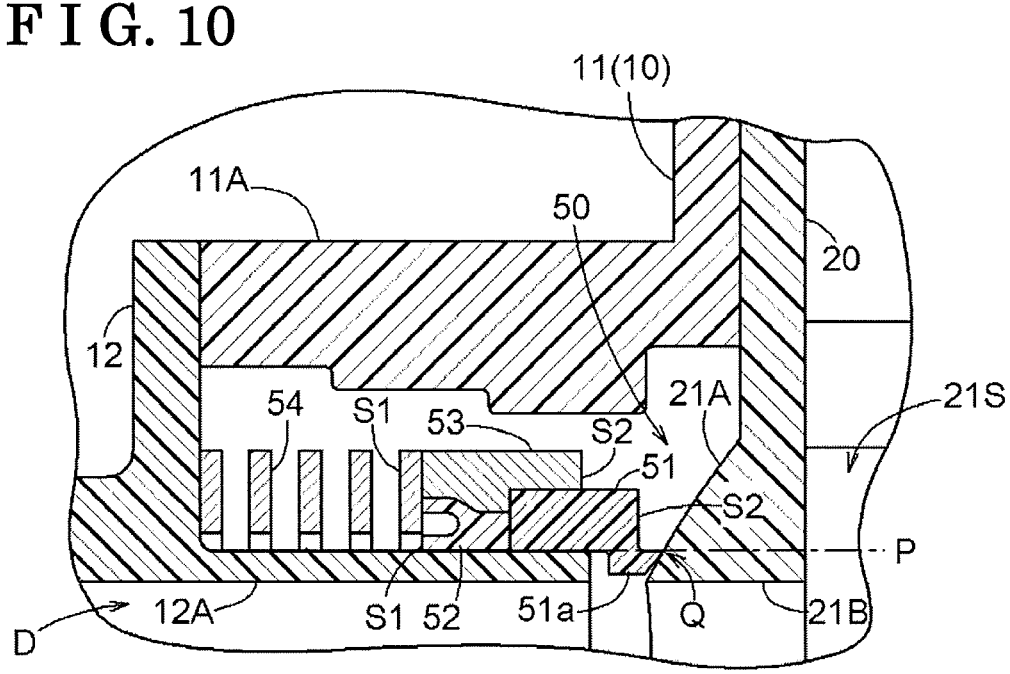
FIG. 10 is a cross-sectional view illustrating a seal ring of another embodiment (b).

(b) As illustrated in FIG. 10, as the seal ring 51, a cylindrical portion 51a is provided at an end portion of the seal ring 51 in a direction in which the seal ring 51 is in contact with the valve body 20. The cylindrical portion 51a includes a diameter which is slightly smaller than an outer diameter of the seal ring 51. An inner circumferential side of the cylindrical portion 51a is formed to include an inclined surface such that an outer circumferential side of the cylindrical portion 51a is in contact with the spherical surface 21A of the valve body 20. In this configuration, the contact position Q can be made to coincide with the virtual or imaginary cylindrical surface P even if the cylindrical portion 51a of the seal ring 51 is worn or abraded, thereby maintaining the sealing performance high.

Figure 11:
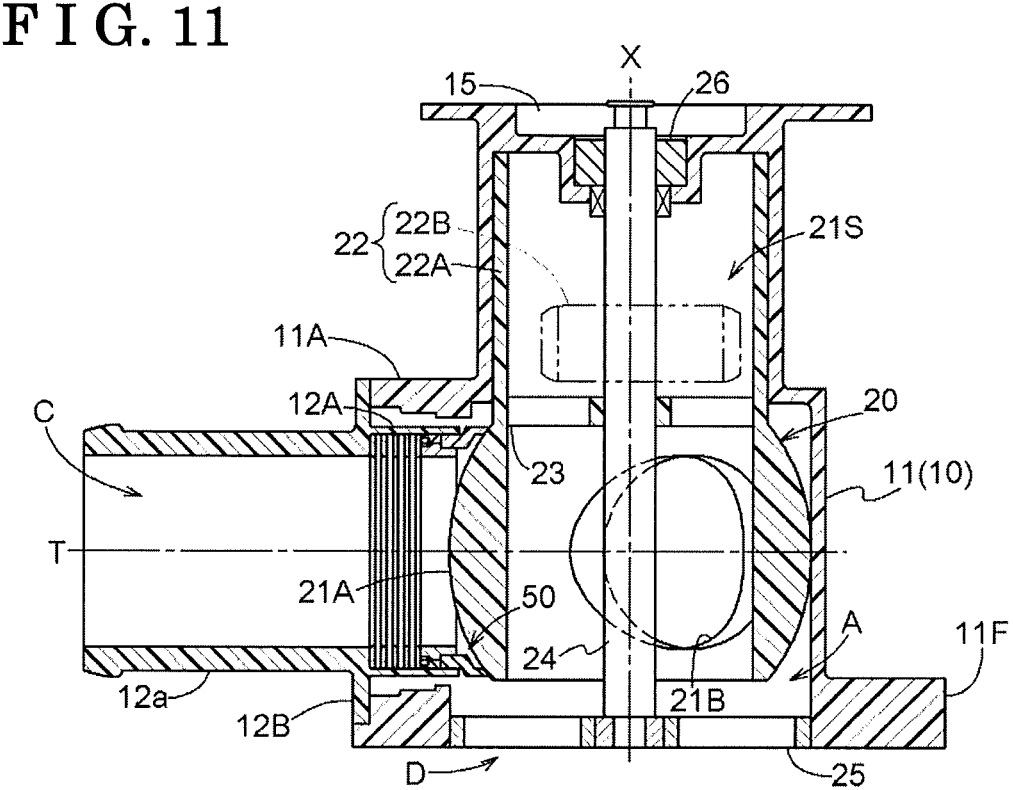
FIG. 11 is a longitudinal cross-sectional view of a valve apparatus of another embodiment (c).
Figure 12:
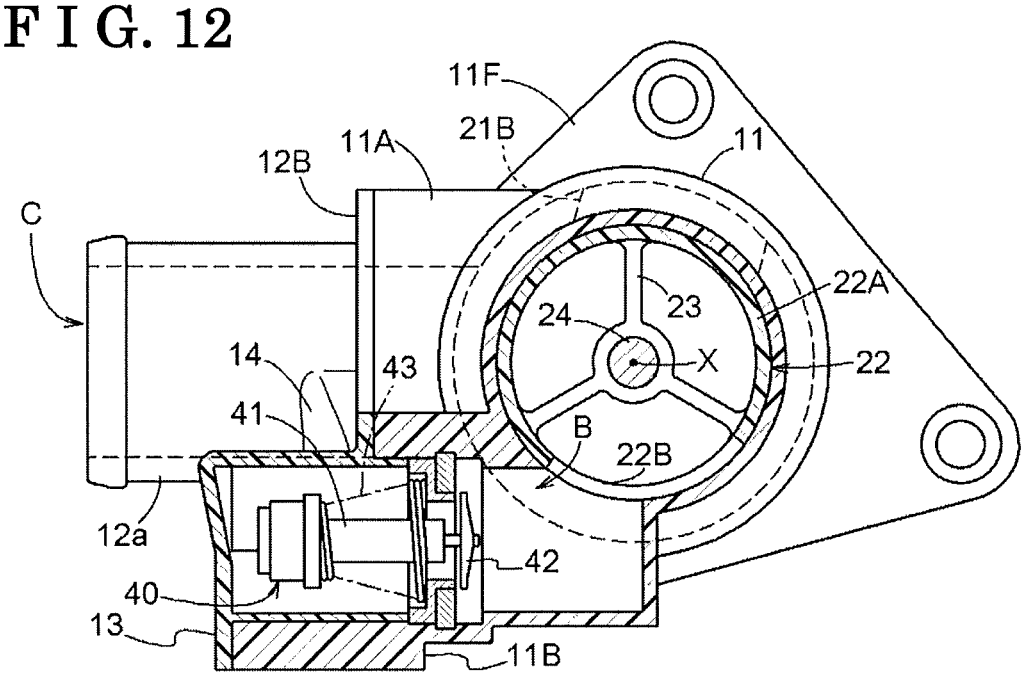
FIG. 12 is a transverse cross-sectional view of the valve apparatus of the embodiment (c).
Figure 13:
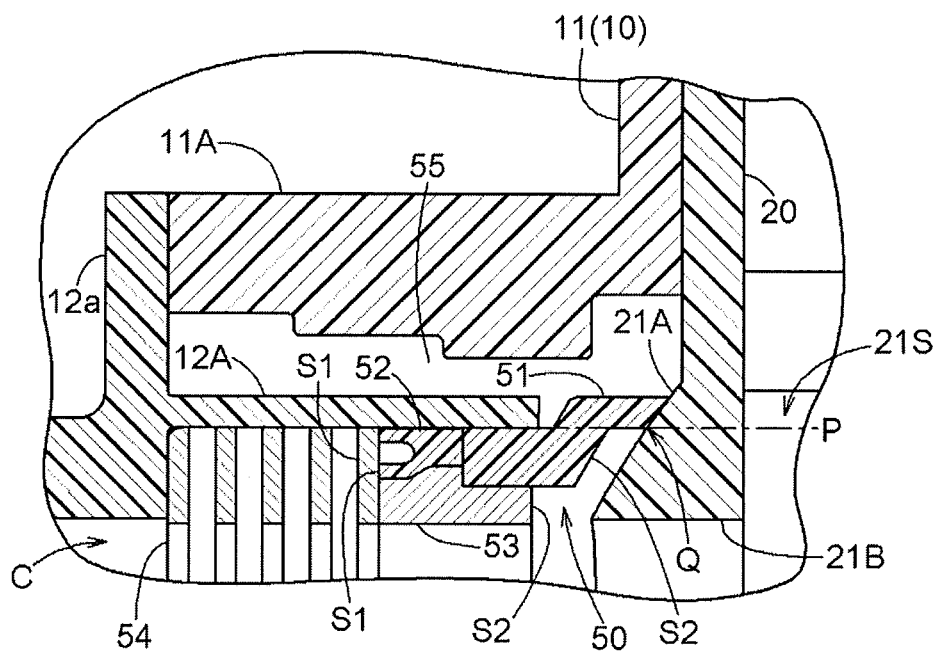
FIG. 13 is a transverse cross-sectional view of a seal mechanism of the embodiment (c).

(c) In FIGS. 11 to 13, an embodiment is illustrated in which the respective positions of the inlet port C and the discharge port D are inverted with respect to each other, relative to the aforementioned embodiment. In this case, for example, by connecting the flange portion 11F formed at the discharge port D to the outer wall of the engine 1, the valve apparatus V is arranged such that the coolant water from the engine 1 is made to flow into the inlet port C via the radiator 2 and the coolant water is sent from the discharge port D to the water jacket.

As illustrated in FIG. 11, the main cylindrical portion 11A that is in communication with the inlet port C is formed at the housing main body 11 and the seal mechanism 50 is provided between the valve body 20 and an inner end of an inlet cylinder 12a serving as the inlet port C. The internal space portion 21S of the valve body 20 is in communication with the discharge port D, and the internal space portion 21S is in communication with the inlet port C in a case where the valve body 20 is set in the open posture.

As illustrated in FIG. 13, the seal mechanism 50 is formed by the seal ring 51, the packing body 52, the support ring 53 and the spring 54, and they are arranged at an inner circumference of the internal sleeve 12A of the inlet cylinder 12a, the internal sleeve 12A which is arranged inside the main cylindrical portion 11A. An inner circumferential surface of the internal sleeve 12A is formed in a cylindrical inner circumferential surface shape of which a center is the sleeve axis T. The packing body 52 includes a lip portion being in contact with an inner surface of the internal sleeve 12A and maintains the water-tightness relative to the inner circumference of the internal sleeve 12A. The packing body 52 separates and prevents the accommodation space accommodating the seal mechanism 50 and the internal space portion 21S of the valve body 20 from being in communication with each other via an outer space portion 55 of the internal sleeve 12A.

In the present embodiment, a space portion at the inner circumference of the internal sleeve 12A corresponds to the seal accommodation portion, and accordingly the mobile body (the seal ring 51, the packing body 52 and the support ring 53 and part of the spring 54) is surrounded by the coolant water from the inlet port C. As a result, the pressure which is equal to the pressure acting on the inlet port C always acts on the first pressure receiving surface S1 and the second pressure receiving surface S2 which are configured to include the same area as each other. Consequently, a constant pressure acts relative to the seal ring 51 in the accommodation space even when the valve body 20 is rotationally operated, and thus the appropriate sealed state can be maintained.

The virtual cylindrical surface P obtained by extending the inner circumferential surface of the internal sleeve 12A in the direction along the sleeve axis T is assumed, and the contact position Q where the virtual cylindrical surface P and the spherical surface 21A intersect each other is set at the circumferentially innermost position in the contact region where the seal ring 51 is in contact with the spherical surface 21A. Accordingly, the first pressure receiving surface S1 and the second pressure receiving surface S2 are formed at an inner side relative to the contact position Q where the virtual cylindrical surface P and the spherical surface 21A intersect each other, and thus the first pressure receiving surface S1 and the second pressure receiving surface S2 are formed to include the same area as each other.

As illustrated in FIG. 12, the temperature sensing chamber B is in communication with the inlet port C via the bypass flow path 14, and the coolant water from the inlet port C is supplied to the fail-safe mechanism 40. Accordingly, when the temperature of the coolant water exceeds the set value, the heat sensing member 41 expands and the on-off valve 42 is opened against the biasing force of the valve spring 43. When the posture which allows the temperature sensing hole portion 22B of the temperature sensing control valve 22 to be fully open is set, the coolant water from the inlet port C is sent to the valve chamber A via the bypass flow path 14 and the temperature sensing chamber B, and then is discharged from the discharge port D.

As a consequence, even in a case where the temperature of the coolant water exceeds the set value under the circumstances where, for example, the posture setting unit 30 has a failure and thus the main control valve 21 remains fixed in the closed posture, the engine 1 is prevented from being overheated because the temperature sensing hole portion 22B is in the open state. On the other hand, the temperature sensing control valve 22 blocks the flow of the coolant water between the valve chamber A and the temperature sensing chamber B from the state in which the main control valve 21 is slightly open to the state in which the main control valve 21 comes to the fully-open. Accordingly, even if the temperature of the coolant water increases, the phenomenon in which the fail-safe mechanism 40 is open can be prevented.

Other Embodiment

A port for supplying to, for example, an EGR cooler and/or a heater core, is provided at the valve housing 10 at a side opposite to the inlet port C with reference to the discharge port D. In this configuration, a valve surface is formed at a side opposite to the inlet port C with reference to the main control valve 21 of the valve body 20 in the direction along the rotational axis X, and a port corresponding thereto is formed at the valve housing 10. The valve surface may be formed at a side opposite to the inlet port C with reference to the main control valve 21 of the valve body 20 in a direction along the sleeve axis T, and a port corresponding thereto may be formed at the valve housing 10.

Also in the configuration of the present embodiment, the coolant water can be supplied to each port reasonably because the valve body 20 includes the internal space portion 21S and can send the coolant water, which flows from the inlet port C, along the rotational axis X or along the sleeve axis T.

INDUSTRIAL APPLICABILITY

The present invention may be used for a refrigerant control valve apparatus which supplies and discharges a refrigerant of an internal combustion engine.

EXPLANATION OF REFERENCE NUMERALS 10 valve housing
12A internal sleeve
20 valve body
21A valve surface (spherical surface)
21B hole portion (main hole portion)
21S internal space portion
31 electric actuator (electric motor)
50 seal mechanism
51 seal body (seal ring)
52 packing body
54 biasing mechanism (spring)
55 outer space portion
C inlet port
D discharge port
E internal combustion engine (engine)
P virtual cylindrical surface
Q contact position
S1 first pressure receiving surface
S2 second pressure receiving surface
T sleeve axis
X rotational axis

The invention claimed is:

1. A refrigerant control valve apparatus comprising:
a valve housing provided with an inlet port to which refrigerant from an internal combustion engine is supplied and a discharge port from which the refrigerant is sent out;
a valve body provided at an inside of the valve housing to be rotatable about a rotational axis, the valve body including an internal space portion to which the refrigerant is supplied from the inlet port and a valve surface corresponding to an outer surface including a spherical shape, the valve body being provided with a hole portion which is formed at the valve surface and allows the internal space portion to be in communication with the discharge port by rotation about the rotational axis, the valve body corresponding to a rotary-type; and
a seal mechanism supported by a member of the valve housing, the member which forms the discharge port, the seal mechanism being in contact with the valve surface of the valve body, wherein
the seal mechanism includes a seal body formed in a ring shape when viewed in a direction in which the refrigerant is discharged at the discharge port, the seal body is contactable with the valve surface of the valve body, the seal mechanism includes a biasing mechanism applying a biasing force to the seal body in a pressing direction towards a spherical center of the valve surface, the seal mechanism includes a first pressure receiving surface and a second pressure receiving surface, the first pressure receiving surface receives pressure acting, in a direction which is same as a biasing direction of the biasing mechanism, from the refrigerant relative to the seal body or to a mobile body including the seal body and moving integrally with the seal body, the second pressure receiving surface receives pressure acting, in a direction which is opposite to the biasing direction, from the refrigerant relative to the seal body or to the mobile body, the first pressure receiving surface and the second pressure receiving surface are formed to include areas which are equal to each other, the seal mechanism is accommodated in a seal accommodation space which is in communication with the inlet port such that pressure of the refrigerant from the inlet port acts relative to the first pressure receiving surface and to the second pressure receiving surface, an internal sleeve including a cylindrical shape is formed coaxially with a sleeve axis which is orthogonal to the rotational axis and passes through the spherical center of the valve surface, the internal sleeve protrudes from the discharge port toward the inside of the valve housing, an outer circumferential surface of the internal sleeve includes a cylindrical outer surface shape of which a center is the sleeve axis, the biasing mechanism and the seal body are arranged at positions surrounding the outer circumferential surface of the internal sleeve to be movable along the sleeve axis, a packing body is provided to be in contact with the outer circumferential surface of the internal sleeve to separate the seal accommodation space and a space portion of an inner circumferential position of the seal body from each other, and a contact position at which a virtual cylindrical surface obtained by extending the outer circumferential surface of the internal sleeve in a direction along the sleeve axis and the valve surface intersect each other is set at a circumferentially outermost position in a contact region in which the seal body is in contact with the valve surface.

2. The refrigerant control valve apparatus according to claim 1, wherein the inlet port supplies the refrigerant in a direction along the rotational axis in the valve housing, and the valve body sends the refrigerant from the inlet port in the direction along the rotational axis in the internal space portion.

3. The refrigerant control valve apparatus according to claim 1, comprising:

an electric actuator rotating the valve body about the rotational axis.

4. A refrigerant control valve apparatus comprising:

a valve housing provided with an inlet port to which refrigerant from an internal combustion engine is supplied and a discharge port from which the refrigerant is sent out;

a valve body provided at an inside of the valve housing to be rotatable about a rotational axis, the valve body including an internal space portion which is in communication with the discharge port and a valve surface corresponding to an outer surface including a spherical shape, the valve body being provided with a hole portion which is formed at the valve surface and allows the internal space portion to be in communication with the inlet port by rotation about the rotational axis, the valve body corresponding to a rotary-type; and a seal mechanism supported by a member of the valve housing, the member which forms the inlet port, the seal mechanism being in contact with the valve surface of the valve body, wherein the seal mechanism includes a seal body formed in a ring shape when viewed in a direction in which the refrigerant is supplied at the inlet port, the seal body is contactable with the valve surface of the valve body, the seal mechanism includes a biasing mechanism applying a biasing force to the seal body in a pressing direction towards a spherical center of the valve surface, the seal mechanism includes a first pressure receiving surface and a second pressure receiving surface, the first pressure receiving surface receives pressure acting, in a direction which is same as a biasing direction of the biasing mechanism, from the refrigerant relative to the seal body or to a mobile body including the seal body and moving integrally with the seal body, the second pressure receiving surface receives pressure acting, in a direction which is opposite to the biasing direction, from the refrigerant relative to the seal body or to the mobile body, the first pressure receiving surface and the second pressure receiving surface are formed to include areas which are equal to each other, the seal mechanism is accommodated in a seal accommodation space which is in communication with the inlet port such that pressure of the refrigerant from the inlet port acts relative to the first pressure receiving surface and to the second pressure receiving surface, the valve housing includes an inlet cylinder as the inlet port, an internal sleeve including a cylindrical shape is formed coaxially with a sleeve axis which is orthogonal to the rotational axis and passes through the spherical center of the valve surface, the internal sleeve protrudes from the inlet cylinder toward the inside of the valve housing, an inner circumferential surface of the internal sleeve includes a cylindrical inner surface shape of which a center is the sleeve axis, the biasing mechanism and the seal body are arranged at the inner circumferential surface of the internal sleeve to be movable along the sleeve axis, a packing body is provided to be in contact with the inner circumferential surface of the internal sleeve to separate the seal accommodation space and an outer space portion of the internal sleeve from each other, and a contact position at which a virtual cylindrical surface obtained by extending the inner circumferential surface of the internal sleeve in a direction along the sleeve axis and the valve surface intersect each other is set at a circumferentially innermost position in a contact region in which the seal body is in contact with the valve surface.

* * * * *